United States Patent [19]

Cox

[11] Patent Number: 5,678,973

[45] Date of Patent: Oct. 21, 1997

[54] VEHICLE SEAT TRANSPORTER CART

[76] Inventor: Raymond G. Cox, 4567 A Loughborough, St. Louis, Mo. 63116

[21] Appl. No.: 503,656

[22] Filed: Jul. 18, 1995

[51] Int. Cl.[6] .................................................. B65G 67/00
[52] U.S. Cl. ................................................ 414/341; 414/469
[58] Field of Search ............................. 414/546, 341, 414/346, 458, 469; 280/47.34, 47.35, 651, 79.3; 254/8 R, 8 B, 8 C

[56] References Cited

U.S. PATENT DOCUMENTS

| | | | |
|---|---|---|---|
| 2,419,422 | 4/1947 | Schulein | 280/79.3 X |
| 3,059,784 | 10/1962 | Chamberlain et al. | 414/754 |
| 3,118,553 | 1/1964 | Rosenzweig | 414/469 |
| 3,168,329 | 2/1965 | Goldschmidt | 280/651 |
| 3,498,628 | 3/1970 | Ferneau et al. | 280/641 |
| 3,508,746 | 4/1970 | Lindsay | 269/17 |
| 3,612,565 | 10/1971 | Zimmerman | 280/47.24 |
| 3,761,107 | 9/1973 | Docherty et al. | 280/659 |
| 3,834,568 | 9/1974 | Larson et al. | 414/546 X |
| 3,865,427 | 2/1975 | Delany | 414/341 X |
| 3,931,902 | 1/1976 | Love, Jr. | 414/458 |
| 4,037,851 | 7/1977 | Romero | 280/79.3 |
| 4,362,458 | 12/1982 | Jantzi | 414/458 |
| 4,493,492 | 1/1985 | Balabanova | 280/651 |
| 4,632,627 | 12/1986 | Swallows | 414/490 |
| 4,895,381 | 1/1990 | Farlow | 280/47.35 X |
| 5,417,541 | 5/1995 | Herron | 414/346 X |
| 5,421,691 | 6/1995 | Ferrone | 414/546 |

FOREIGN PATENT DOCUMENTS

| | | | |
|---|---|---|---|
| 619241 | 5/1961 | Canada | 280/47.34 |
| 56396 | 3/1994 | Japan | 414/346 |

*Primary Examiner*—David A. Bucci
*Attorney, Agent, or Firm*—Haverstock, Garret & Roberts

[57] ABSTRACT

A vehicle seat transporter cart device for facilitating the removal of a rear vehicle seat from a typical van or utility/sport-type vehicle and transporting the same to a desired storage location including a base member having a plurality of wheel members associated therewith for readily moving the overall cart device from one location to another, an upright support structure removably attachable to the base member, a platform member removably attachable to the upright support member for receiving and holding the vehicle seat thereon, the height of the platform member being adjustable relative to the base member so as to be compatible with the height of the rear bed area of the particular vehicle in question, and an additional support mechanism for supporting the platform member in a substantially horizontal position above the base member when a vehicle seat is positioned thereon, the additional support mechanism preferably comprising the standard vehicle jack which accompanies the particular vehicle in question, the vehicle jack being engageable with an extension member associated with the underside portion of the platform member. A plurality of movable carrier assemblies are also provided for transporting the vehicle seat from its previously located position in the vehicle to adjacent the rear portion thereof prior to mounting the same unto the present cart device, each carrier assembly being cooperatively engageable with at least a portion of the understructure associated with the vehicle seat when it is unfastened from its floor mounts. When not in use, the present cart device is easily collapsible into a horizontal storage position which provides a compact profile for easy storage in minimum space.

15 Claims, 3 Drawing Sheets

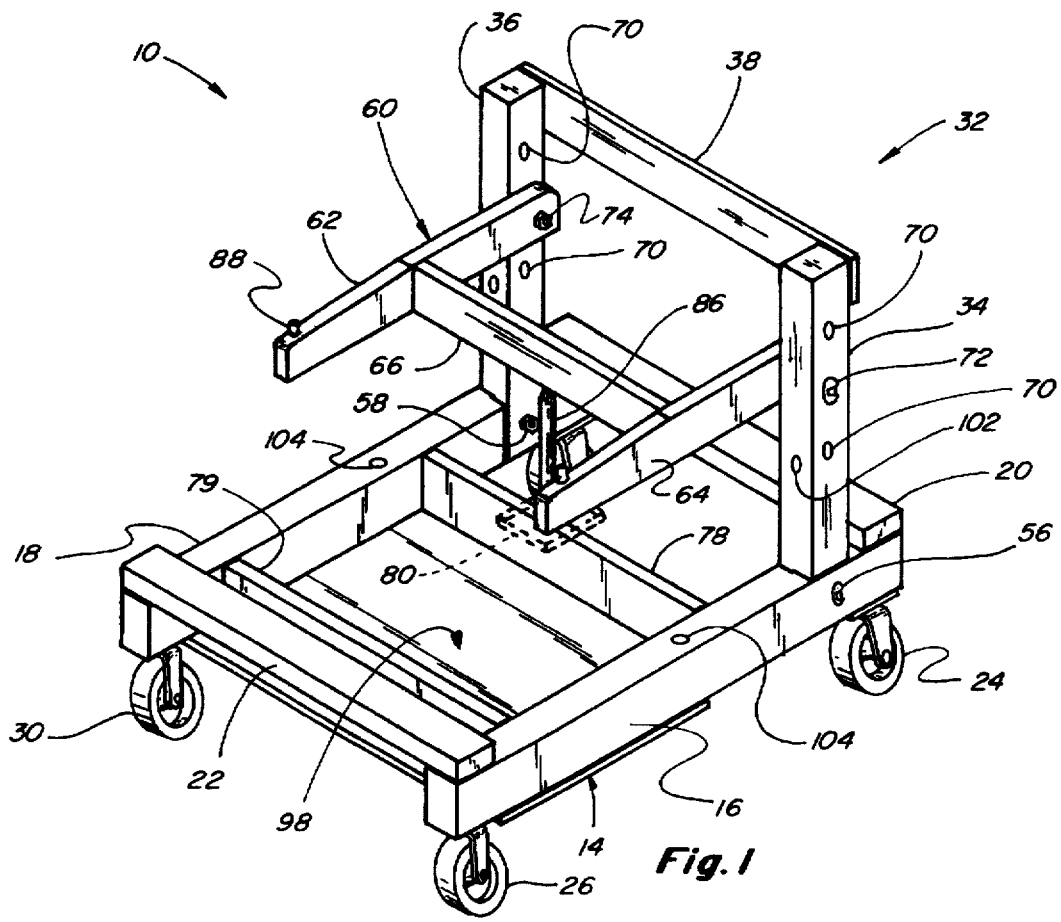
Fig. 1
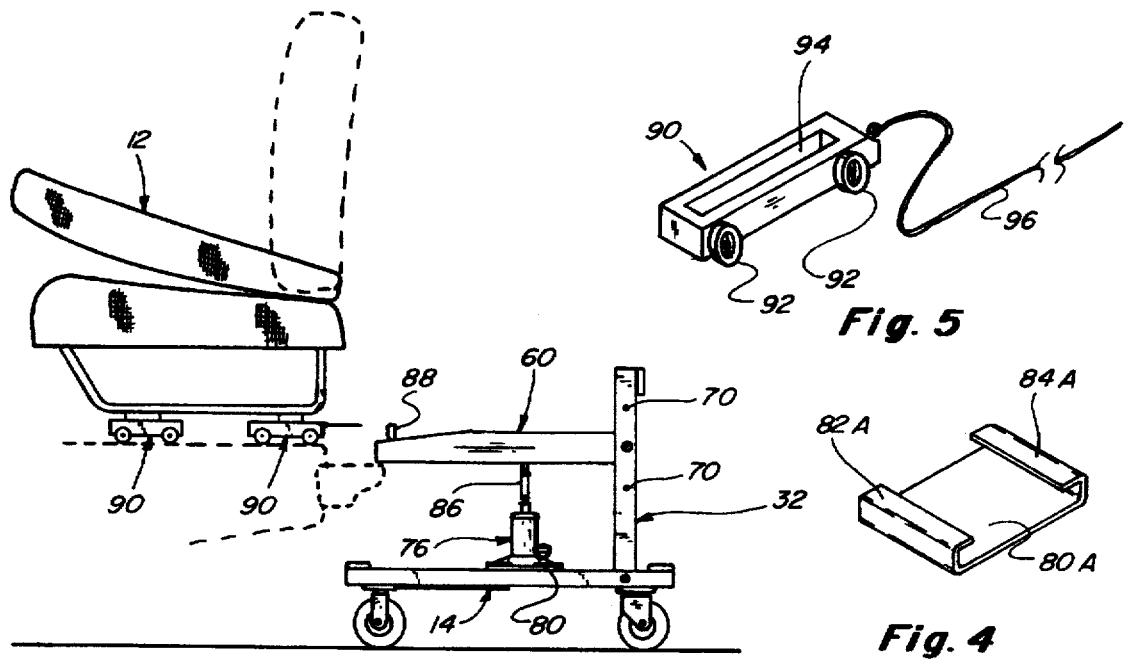
Fig. 3
Fig. 5
Fig. 4

VEHICLE SEAT TRANSPORTER CART

The present invention relates to a vehicle seat transporter cart which is specifically designed to facilitate the removal of the rear vehicle seat from a typical van or utility/sport-type vehicle and to readily transport such rear vehicle seat from the vehicle to a desired storage location. More particularly, the present vehicle seat transporter cart includes a base member having a plurality of wheels, a collapsible upright support member and a rotatable horizontal platform member, the horizontal platform member being adjustable to align the platform member with the rear bed area of a particular vehicle for easily receiving the vehicle seat. The present cart device is particularly beneficial and advantageous in that it enables a user to easily and conveniently roll the vehicle seat on the present cart, instead of physically carrying such seat, over long distances to a desired storage location. Also, since many of these rear vehicle seats are quite heavy, the present cart device makes the task of storing and removing such seats much easier and less physically demanding.

BACKGROUND OF THE INVENTION

The rear vehicle seat associated with most vans and other types of utility/sport-type vehicles is typically removable from such vehicles so as to enlarge the rear bed area of such vehicles so that it can be used in a utility type fashion. Because of space limitations and the weight associated with these seats, it is often times extremely difficult for one individual to remove such seats from the rear portion of these vehicles and, subsequently, to lift or carry such seats to a suitable storage place. Often times it takes at least two individuals to carry these particular seats from the vehicle to a suitable storage location. The present invention is specifically designed to facilitate the removal of such seats from the rear portion of these types of vehicles and, thereafter, to easily and conveniently enable one individual to transport such seat to a suitable storage location. In similar fashion, the present transporter cart is also used to transport the vehicle seat back to the vehicle for re-installation therein.

SUMMARY OF THE INVENTION

The present seat transporter cart device teaches the construction of an adjustable, mobile device which includes three main assemblies, namely, a base member, an upright support structure, and a horizontal platform member. The base member is substantially rectangular in shape although it may be constructed of a wide variety of other shapes so long as it is supportive of the upright support assembly when a vehicle seat is placed upon the horizontal platform member as will be hereinafter being explained. The base member includes a plurality of wheel members which allow the present cart device to be easily transportable from one location to another when a vehicle seat is positioned thereon. Preferably, at least some of the wheel members are pivotable to even greater facilitate the maneuverability of the present cart device.

The base member further includes a storage compartment located therewithin, the storage compartment being specifically designed and dimensioned for storing a plurality of carrier assemblies when not in use. The carrier assemblies are used to maneuver the particular vehicle seat from its normal location within the vehicle to the rear portion of such vehicle for mounting onto the present cart device. The carrier assemblies are simply small vehicle type members with wheels which include an elongated slot specifically dimensioned so as to receive at least a portion of the understructure associated with the rear vehicle seat when it is unfastened from its floor mounts. The storage compartment is designed to hold and store at least four (4) individual carrier assemblies, one carrier assembly being respectively engaged with each of the four respective corners associated with a typical rear van or utility/sport type vehicle seat. Once the vehicle seat is unfastened from its floor mountings and the carrier assemblies are maneuvered into their operative positions, the rear vehicle seat can be easily rolled from its previously located position in the vehicle to the rear bed portion thereof for mounting onto the present cart device. Preferably, the carrier assemblies positioned adjacent the rear portion of the vehicle seat are equipped with a cord or other pulling type member so as to allow the user to pull the carrier assemblies with the vehicle seat positioned thereon towards the rear bed area of the vehicle as previously explained. Although the elongated slots associated with each of the carrier assemblies are specifically designed to receive and engage at least a portion of the typical understructure associated with these types of detachable rear vehicle seats, it is recognized and anticipated that any means for engaging the individual carrier assemblies with the underside portion of these types of rear vehicle seats may be utilized to achieve the stated objective.

Once the particular rear vehicle seat is maneuvered to the rear portion of the vehicle via the carrier assemblies, the vehicle seat is ready for positioning onto the cart device. In this regard, both the upright support structure as well as the horizontal platform member are each separate components which can be attached to the base member in either an operative working position, or a storage position, as will be hereinafter explained. In its operative position, the upright support structure can be attached to the base member in a wide variety of acceptable arrangements. For example, in the preferred embodiment disclosed herein, the opposed upright side members associated with the upright support structure are cooperatively engageable with the opposed side wall portions of the base member and each include respective aligned openings for receiving a pair of connecting screws or other fastening members which are inserted therethrough for securing each respective upright side support or column member with the corresponding side wall of the base member. Each upright side support or column member further includes a plurality of opposed openings which function as adjustment means for attaching the horizontal platform member to the upright support structure. Depending upon the height of the rear bed area associated with the particular van or utility/sport vehicle in question, the horizontal platform member can be positioned at the appropriate height so that the rear vehicle seat can be easily and conveniently rolled from the rear bed area of the vehicle directly onto the horizontal platform member of the present cart device. Once the appropriate height is determined, the horizontal platform member is secured to the upright support structure via suitable fastening means.

The horizontal platform member should be of suitable size and structure to support the types of rear vehicle seats used in the vehicles in question. In this regard, the horizontal platform member likewise includes a pair of stop members positioned for preventing the vehicle seat from moving forward on the cart device once it is properly positioned thereon. When attached to the upright support structure, the horizontal platform member is angularly rotatable about its fastening means and is held in a substantially horizontal orientation through the use of a vehicle jack or other appropriate means. Preferably, a standard vehicle jack associated with the vehicle in question is used and functions to angularly rotate the horizontal platform member into a functional supporting position as will be hereinafter further explained. To achieve this end, the base member includes means for securely holding the base portion of the jack in proper position for engagement with the jack receiving means associated with the underside portion of the horizontal platform member. The jack receiving means is specifically designed to work in conjunction with a standard vehicle jack so that it will provide the necessary stable support for holding a typical rear vehicle seat thereon. It is also recognized that other suitable and appropriate means other than a standard vehicle jack can likewise be utilized to properly orient the horizontal platform member for use as explained above. Like the upright support member, the horizontal platform member is likewise completely detachable from the upright support structure.

Since the upright support structure and the horizontal platform member are detachable from each other and from the base member, these members can be placed in a horizontal storage position on the base member and can be secured thereto through the use of the same fastening means which connect the base member to the upright support member. In this regard, storage openings are associated with the topside portion of each of the respective base member side walls to secure all components of the present cart device including securing the carrier assemblies within the storage compartment on the base member. Disassembly of the present cart device and orientation of all components into a horizontal storage position provides a compact profile which enables the present device to be easily stored in minimum space when not in use.

It is therefore a principal object of the present invention to teach the construction and operation of a vehicle seat transporter cart that is readily mobile and can easily transport a vehicle seat from one position to another.

Another object is to teach the construction and operation of a vehicle seat transporter cart which is relatively easy to assemble and use.

Another object is to provide a vehicle seat transporter cart that is easily collapsible into a compact storage position.

Another object is to provide a vehicle seat transporter cart which includes a plurality of carrier assemblies for easily moving the vehicle seat from the interior of the vehicle to a position adjacent the rear bed area thereof for maneuvering the vehicle seat unto the present cart device.

Another object is to teach the construction and operation of a vehicle seat transporter cart which utilizes a removably attachable upright support structure as well as a removably attachable platform member, the upright support structure including adjustment means for properly locating the platform member relative to the rear bed area of the particular vehicle in question.

Another object is to teach the construction and operation of a vehicle seat transporter cart which utilizes means for easily maneuvering the particular vehicle seat from its normal location within the vehicle to the rear portion thereof for mounting unto the present cart device.

Another object is to provide a vehicle seat transporter cart which is easily transportable and maneuverable from one location to another.

These and other objects and advantages of the present invention will become apparent to those skilled in the art after considering the following detailed specification in conjunction with the accompanying drawings.

BRIEF DESCRIPTION OF THE DRAWINGS

FIG. 1 is a perspective view of the present vehicle seat transporter cart device constructed according to the teachings of the present invention, the present cart device being illustrated in its functional operative position;

FIG. 3 is a side elevational view of the present cart device showing the platform member in proper position adjacent the rear bed area of a particular vehicle for receiving a vehicle seat for positioning thereon;

FIG. 4 is a perspective view of another embodiment of the jack holding means used with the present cart device;

FIG. 5 is a perspective view of one of the carrier assemblies associated with the present cart device;

DESCRIPTION OF THE INVENTION

Figure 2:
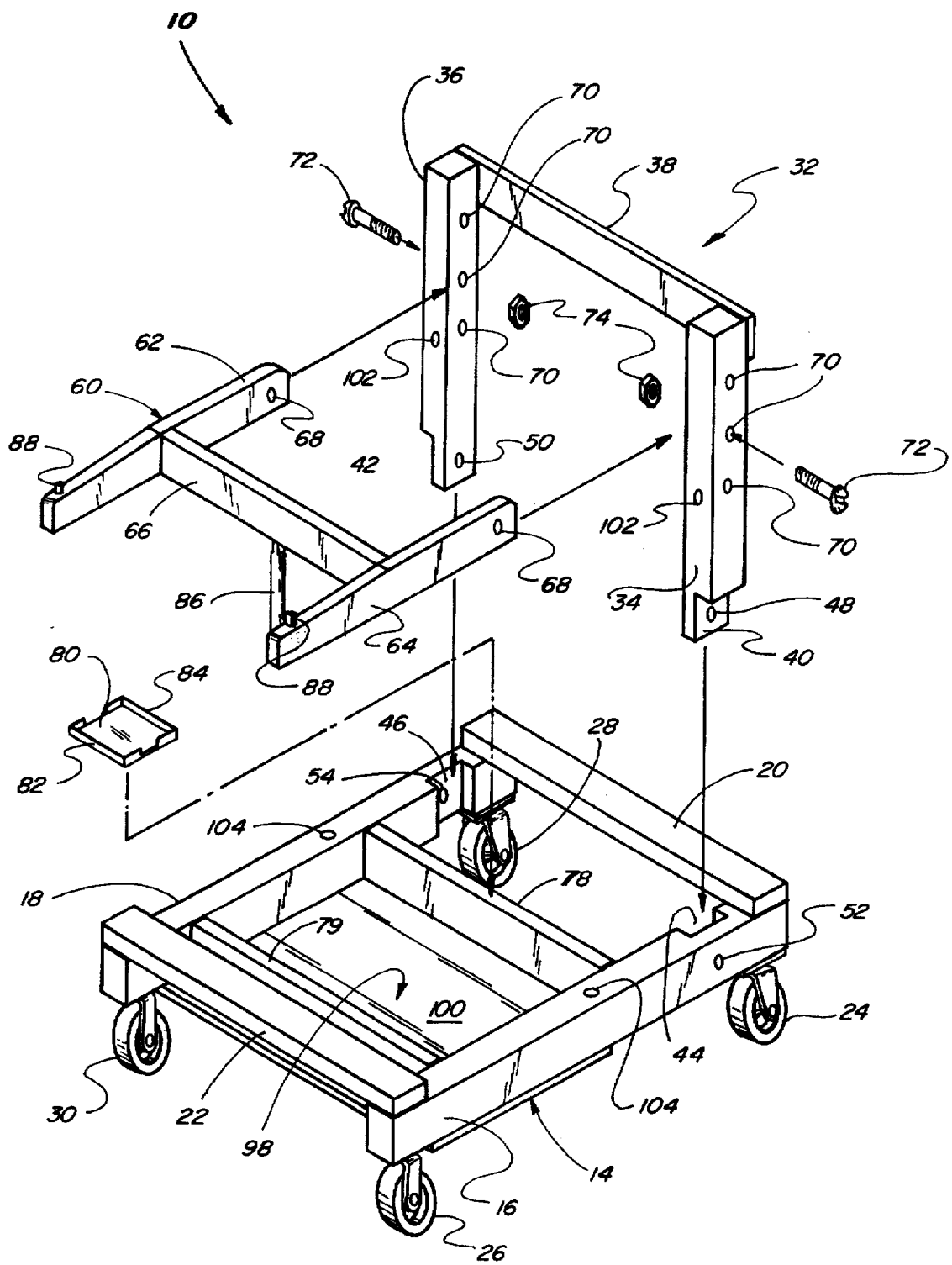
FIG. 2 is an exploded perspective view of the cart device illustrated in FIG. 1.

Referring to the drawings more particularly by reference numbers wherein like numerals refer to like parts, number 10 in FIG. 1 identifies a vehicle seat transporter cart constructed according to the teachings of the present invention. The vehicle seat transporter cart 10 functions to provide the user with a device that allows a single individual to maneuver and place a rear vehicle seat from a typical van or utility/sport-type vehicle such as the vehicle seat 12 illustrated in FIG. 4 unto the present cart 10 and thereafter easily transport such vehicle seat from a vehicle to a storage location and back again. The vehicle seat transporter cart 10 includes a base member 14 which is preferably rectangular in shape as shown in FIGS. 1, 2 and 3, although a wide variety of other sizes and shapes may likewise work equally as well. The base member 14 includes a pair of opposed parallel side wall members 16 and 18 which are conventionally attached to a pair of opposed cross side wall members 20 and 22 as best shown in FIG. 2. In order to provide the required mobility so that the present cart 10 can be transported from one location to another, the base member 14 further includes a plurality of wheel members such as the wheel members 24, 26, 28 and 30 attached to the underside portion thereof as best shown in FIGS. 1–3. The wheel members may be of any design and may be attached in any manner as long as they allow for easy mobility of the cart 10. Preferably the wheel members 24–30 are located at the respective corners of the base member 14 for proper balance and weight distribution, although other arrangements and attachment locations are likewise recognized and anticipated. In addition, some or all of the wheel members 24, 26, 28, 30 are likewise preferably castored or pivotal thereby further improving the maneuverability of the cart 10.

An upright support structure 32 is removably attached to the base member 14 as best shown in FIGS. 1 and 2. In its preferred embodiment, the support structure 32 is substantially U-shaped in construction and includes a pair of opposed upright side or column members 34 and 36 as well as a cross support member 38 which extends therebetween adjacent the respective top end portions of the upright members 34 and 36. The lower end portion of each upright member 34 and 36 includes a notched or extension portion 40 and 42 respectively as best shown in FIG. 2, the extension portions 40 and 42 being cooperatively engageable with and receivable within corresponding grooves or cut-out portions 44 and 46 formed respectively in the opposed base side wall members 16 and 18 as shown in FIG. 2. The support structure 32 is removably attached to the base member 14 by slidably inserting the upright extension portions 40 and 42 into their corresponding grooves 44 and 46. The upright extension portions 40 and 42 are shaped and dimensioned to integrally mate with the base side wall grooves 44 and 46 thereby forming an interlocking connection between the support structure 32 and the base member 14. When so positioned, a portion of each upright member 34 and 36 rests upon a portion of each respective base side wall member 16 and 18 thereby providing further support and stability to the upright support structure 32 when attached to the base member 14. In this regard, when the support structure 32 is positioned as explained above for attachment to the base member 14, respective openings 48 and 50 extending through the upright extension portions 40 and 42 align with corresponding openings 52 and 54 extending through the grooved portions 44 and 46 of the base side wall members 16 and 18 for receiving a suitable fastener member therethrough such as the fastener members 56 and 58 illustrated in FIG. 1. The fastener members 56 and 58 removably attach the upright support structure 32 to the base member 14 as best shown in FIGS. 1 and 2. It is recognized and anticipated that a wide variety of other fastening means including other non-fastening means may be utilized to effect attachment of the upright support structure 32 to the base member 14. It is also recognized and anticipated that the upright support structure 32 may likewise take on a wide variety of other shapes and dimensions as compared to the U-shaped configuration disclosed herein so long as such configuration does not interfere with attachment of the platform member to the upright support structure 32 as will be hereinafter explained.

A platform member 60 (FIGS. 1 and 2) is likewise removably attachable to the upright support structure 32 and includes a pair of opposed support members 62 and 64 and at least one cross support member 66 as illustrated in FIGS. 1 and 2. The cross support member 66 extends between and is attached at each opposite end thereof to the platform support members 62 and 64 so as to provide strength, stability and support to the overall platform member. The overall length of each platform support member 62 and 64 should be sufficient to adequately hold a typical rear vehicle seat commonly associated with vans and utility/sport-type vehicles. Also, any number of cross support members 66 may be associated with the platform member 60 depending upon the weight of the different types of vehicle seats to be carried thereon and the load carrying capability of platform support members 62 and 64. It is recognized that the overall shape and configuration of the platform member 60 may vary widely so long as such structure is sufficient to readily support a vehicle seat when positioned thereon.

As best shown in FIG. 2, one end portion of each of the platform support members 62 and 64 includes an opening 68 which can be positioned in alignment with any one of a plurality of spaced openings 70 associated with each respective upright member 34 and 36, the aligned openings 68 and 70 being configured to receive a suitable fastener member therethrough such as the screw and nut arrangement 72 and 74 illustrated in FIG. 2. The plurality of vertically spaced openings 70 associated with each of the upright support members 34 and 36 allow the platform member 60 to be positioned at any one of a variety of different heights so as to substantially match-up with the plane of the rear bed area associated with the particular vehicle in question such that the rear vehicle seat can be easily and conveniently transported from the vehicle directly onto the platform member 60. Once the appropriate height is determined and the platform openings 68 are positioned adjacent the appropriate set of openings 70, the platform member 60 is secured to the upright support structure 32 via the fastening members 72 and 74, or any other suitable fastening means. Once the platform member 60 is attached to the upright support structure 32, the platform member is angularly rotatable on the axis created by the fastening means 72 and 74 respectively between a substantially horizontal seat carrying position as shown in FIG. 1 and a position angularly oriented relative thereto. The angular rotation of the platform member 60 may be advantageous for reasons which will be hereinafter explained.

Because of the pivotability of the platform member 60 when attached to the upright support structure 32, additional support means must be utilized to functionally hold the platform member 60 in its substantially horizontal operative position. Such additional support means may include a telescoping type adjustable locking bar member (not shown) or, preferably, the jack means 76 best illustrated in FIG. 3, both of which means support the platform member 60 in the selected functional position. The present vehicle seat transporter cart device 10 is designed to utilize the standard vehicle jack associated with the particular vehicle in question such as the jack means 76. In this regard, an intermediate base cross support member 78 (FIGS. 1 and 2) is strategically positioned so as to lie in substantially the same plane as the platform cross support member 66 when the platform member 60 is in its substantially horizontal position and the member 78 includes means in the form of a plate member 80 for securely holding the jack means 76 in a substantially rigid and stable position. The jack holding plate 80 is fixedly secured to the base cross support member 76 as best shown in FIG. 3 by any suitable means and includes side peripheral wall portions 82 and 84 which are dimensioned to hold and capture the base portion of the jack means 76 and prevent sideward movement when positioned therebetween. In this regard, FIG. 4 illustrates another embodiment of a jack holding plate 80A having overhanging side lip portions 82A and 84A, the overhanging lip portions 82A and 84A being specifically dimensioned to extend over and capture the base portion of certain differently configured jack base portions when positioned within the holding plate 80A. It is recognized and anticipated that the members 80 and/or 80A can take on a wide variety of different shapes and configurations so as to conform to the particular base portion associated with the vehicle jack means used in conjunction with the present cart device 10. It is also recognized and anticipated that any other suitable means for substantially holding the jack means 76 in a stable upright position on the base cross support member 78 or any other portion of the base member 14 may likewise be utilized. Regardless of which jack holding means are utilized, it is important that the jack means 76 remain substantially secured and captured while in use since the jack means 76 will be supporting the weight of the vehicle seat positioned upon the platform member 60.

To minimize the vertical travel of the piston member associated with the jack means 76, jack receiving means such as the pivotable bar member 86 are attached to the underside portion of the platform cross support member 66 as best shown in FIGS. 1 and 2. The free end portion of the bar member 86 is specifically configured for cooperative engagement with the piston member associated with the jack means 76 such that as the jack is elevated upwardly, the jack piston member engages the jack receiving means 86 and both rotate and elevate the platform member 60 to the desired horizontal position. In this regard, it is important that the jack holding means 80 and the jack receiving means 86 be positioned and located respectively such that the jack means 76 will mate with and interact with the jack receiving bar means 86 thereby not only elevating the platform member 60 but, importantly, also providing the necessary and adequate support for supporting the vehicle seat when positioned thereupon. It is also recognized that a wide variety of different vehicle jack means may be used to elevate and support the platform member 60 so long as such jack means adequately engages the jack receiving means 86 and provides the necessary support and load carrying capability for the platform member 60 when a vehicle seat is positioned thereupon. The jack receiving bar means 86 should be properly dimensioned so as to engage the jack means 76 before such jack means reaches its maximum vertical extension, regardless of which pair of openings 70 are being utilized. This will further ensure stability when the jack means 76 is extended to support a particular vehicle seat at a particular platform elevation. The jack means 76 therefore functions not only to hold and support the platform member 60 as well as a vehicle seat positioned thereupon, but it also functions to move the platform member 60 into proper position so as to more easily receive a particular vehicle seat from the rear bed area of the vehicle.

Once the platform member 60 is properly positioned and located via the jack means 76 as previously explained, the present cart device 10 is then maneuvered adjacent the rear bed area of the particular vehicle in question and is properly oriented as illustrated in FIG. 3 so as to more easily facilitate the transfer of the vehicle seat 12 from the rear bed area to the platform member 60. In this regard, it is recognized that the platform member 60 may not always be in proper alignment with the rear bed area of the particular vehicle in question and, in such a situation, it may be necessary to initially position the platform member 60 below the horizontal plane of the rear bed area of the vehicle and thereafter angularly adjust and rotate the platform member upwardly to an appropriate angular position such that the free end portions of the platform member 60 lie adjacent to the rear bed area of the vehicle. In this particular situation, this procedure will allow the vehicle seat 12 to be more readily transferred from the vehicle to the platform member and the slight upward angular orientation of the platform member 60 will actually serve as a further means for preventing the vehicle seat 12 from moving forward off of the platform member 60 during transportation. In this regard, it is important to note that each of the platform support members 62 and 64 include stop means in the form of a projection member 88 which further serve to prevent the particular vehicle seat 12 from sliding forwardly off of the platform member 60. It is again recognized that other suitable means may likewise serve as stop means to prevent the vehicle seat from sliding forward off of the platform member when the cart device 10 is in motion transporting the vehicle seat from one location to another.

Once the present cart device 10 is properly oriented and positioned as illustrated in FIG. 3, a plurality of carrier assemblies such as the carrier assembly 90 illustrated in FIG. 5 may be utilized to facilitate movement of the vehicle seat 12 from its functional seat position located in the interior of the vehicle to a position adjacent the rear portion of the vehicle bed area for transfer onto the platform member 60 of the cart device 10. Each carrier assembly 90 is simply a small vehicle type structure having a plurality of wheel members 92 attached to the underside portion of each assembly 90 to provide rolling mobility as will be hereinafter explained. Each carrier assembly 90 likewise includes an elongated slot 94 as best illustrated in FIG. 5, the slot 94 being specifically sized and dimensioned so as to receive at least a portion of the understructure associated with the vehicle seat 12 when it is unfastened from its floor mounts. In this regard, most rear vehicle seats such as the vehicle seat 12 include downwardly extending frame portions located at the approximate four corners of the seat 12 which will engage the slot 94 of a particular carrier assembly 90 when the carrier assembly is positioned underneath such typical seat understructure. Once the vehicle seat 12 is unfastened from its floor mountings, the carrier assemblies 90 can be maneuvered and positioned into their operative positions as best shown in FIG. 3 so as to engage the appropriate vehicle seat understructure associated with each of the four respective corners thereof. Once so positioned, the carrier assemblies 90 will enable the vehicle seat to be easily rolled from its previously located positioned in the vehicle to the rear portion thereof. Preferably, the carrier assemblies 90 positioned adjacent the rear portion of the vehicle seat 12 are equipped with a cord or other pulling type member such as the cord 96 (FIG. 5) so as to allow a user to pull the cart assemblies with the vehicle seat 12 positioned thereon towards the rear portion of the vehicle whereby the vehicle seat may be lifted off of the carrier assemblies 90 and placed onto the platform member 60 of the present cart device 10. Although the elongated slots 94 associated with each carrier assembly 90 are specifically designed to receive and engage at least a portion of the typical understructure associated with these types of detachable rear vehicle seats such as the vehicle seat 12, it is recognized and anticipated that any means for engaging the individual carrier assemblies with the underside portion of the vehicle seat 12 may be utilized to accomplish this task.

Once the particular vehicle seat 12 is maneuvered to the rear of the vehicle via the carrier assemblies 90, the vehicle seat is ready for positioning onto the platform member 60. Depending upon the height of the rear bed area associated with the particular van or utility/sport-type vehicle in question, the platform member 60, as previously explained, can be positioned at the appropriate height so that the rear vehicle seat 12 can be easily and conveniently transported from the rear bed area of the vehicle directly onto the platform member 60 of the present cart device 10. The present cart device 10 is now ready for movement so as to transport the vehicle seat 12 to a desired storage location.

Figure 6:
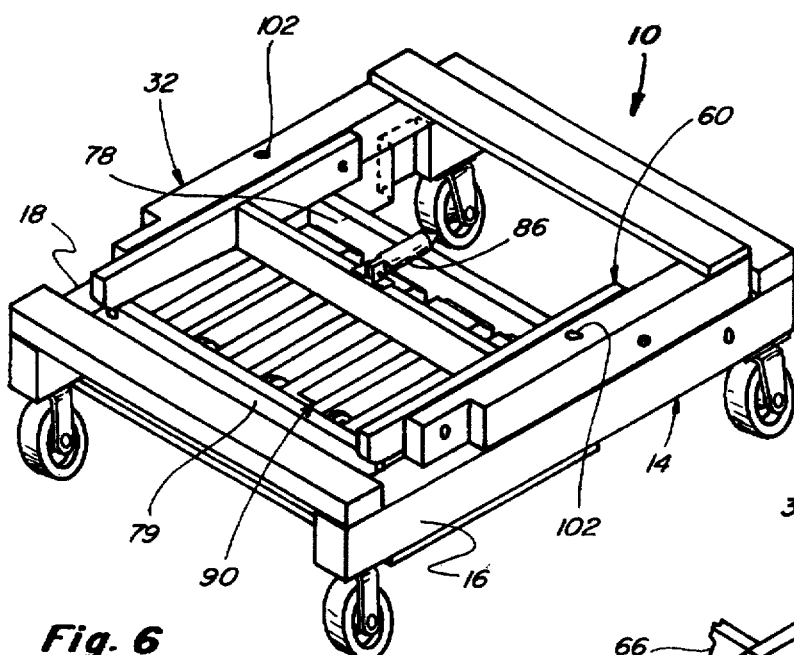
FIG. 6 is a perspective view showing the present cart device in its collapsed storage position.

As best shown in FIG. 6, when not in use, the present cart device 10 can be easily disassembled and all components can be oriented into a horizontal storage position thereby providing a relatively compact profile which enables the present device to be easily stored in minimum space. In this regard, the base member 14 includes a storage compartment 98 as best shown in FIGS. 1 and 2, which compartment is specifically designed and dimensioned for storing and housing at least four of the carrier assemblies 90 therewithin. The storage compartment 98 is defined by opposed cross support members 78 and 79 as well as by portions of the opposed base side wall members 16 and 18. A floor member 100 extends between the respective side walls forming the storage compartment 98 as likewise shown in FIGS. 1 and 2. Although the compartment 98 is designed to hold four carrier assemblies 90, the dimensions of the compartment may be altered to receive and hold any number of carrier assemblies. It is also recognized and anticipated that any other storage arrangement may be utilized for housing the carrier assemblies 90 when not in use. Once the carrier assemblies 90 are positioned within the storage compartment 98, the upright support structure 32 is detachably removed from the base member 14 by unfastening and removing the fastener members 56 and 58. Once this is accomplished, the platform member 60 can be angularly rotated so as to lie parallel with the upright support members 34 and 36 as best illustrated in FIG. 6. The jack receiving means 86 is likewise similarly pivotally rotatable such that the support structure 32 and the platform member 60 can be positioned in a horizontal plane on top of the base member 14 as illustrated in FIG. 6. Once so positioned, the respective openings 102 associated with the upright support members 34 and 36 are positioned so as to align with corresponding openings 104 associated with the topside of the base side wall members 16 and 18 and the fastener members 52 and 54 can be inserted respectively therethrough so as to fixedly secure the collapsed assemblies 32 and 60 to the base member 14. This arrangement not only prevents the members 32 and 60 from sliding or otherwise moving off of the base member 14, but such arrangement also allows the entire collapsed assembly to be picked up by hand and stored in a vertical position to even further minimize the required space for storing the present cart device 10 when not in use. Also, since the platform member overlays the storage compartment 98 when the upright support member 32 is secured to the base member 14, such collapsed arrangement likewise securely holds and prevents the individual carrier assemblies 90 from exiting the storage compartment 98 even when the present cart device 10 as illustrated in FIG. 6 is oriented in a vertical position. As one can see, the collapsed stored condition of the present device 10 as illustrated in FIG. 6 is advantageous in that it occupies minimum space for storage when the present device is not in use.

Figure 7:
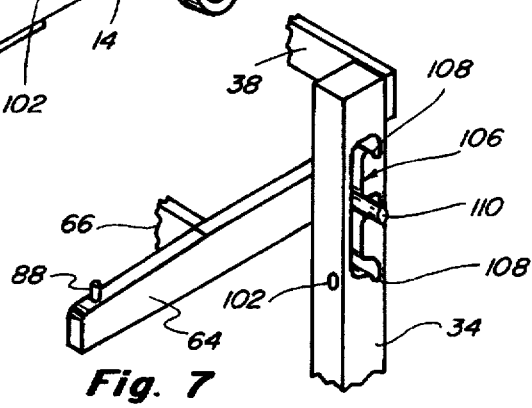
FIG. 7 is a partial perspective view of an alternative arrangement for attaching the platform member to the upright support structure.
Figure 8:
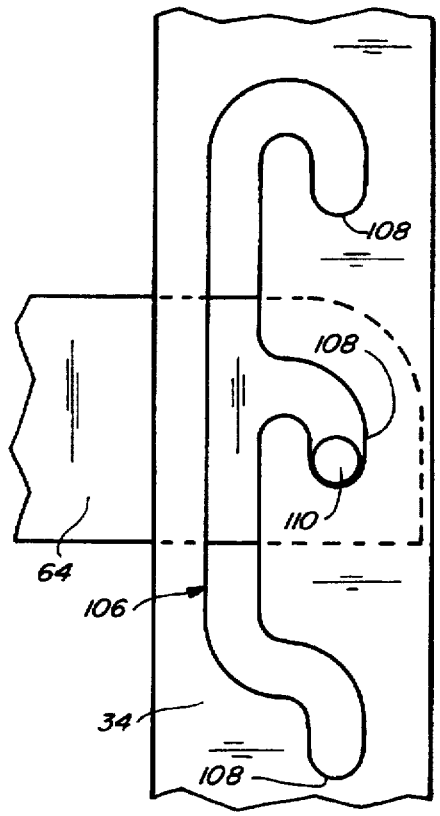
FIG. 8 is an enlarged fragmentary side elevational view showing the pin and slot attachment means associated with the alternative arrangement illustrated in FIG. 7.

FIGS. 7 and 8 illustrate an alternative arrangement for adjustably positioning the platform member 60 relative to the upright support structure 32 so as to properly position the platform member at the appropriate height for receiving the vehicle seat from the rear bed area of a particular vehicle. Instead of utilizing the plurality of spaced openings 70 associated with each upright support member 34 and 36 as illustrated in FIGS. 1 and 2, the adjustment means illustrated in FIGS. 7 and 8 include a slot and pin arrangement that allows the platform member 60 to be moved within the upright support members 34 and 36 in such a manner so as to adjust the vertical height thereof without detaching the platform member 60 from the support structure 32. More particularly, each upright support member 34 and 36 includes a slot 106 extending either partially or completely therethrough configured as shown in FIG. 8. The slot 106 includes a plurality of offset slot portions 108, each slot portion 108 being adaptable for receiving and holding a pin member 110 associated with each platform support member 62 and 64 as shown in FIGS. 7 and 8. This particular arrangement enables a user to physically move the platform member 60 up or down within the slot 106 so as to locate the respective pin members 110 in the appropriate offset slot portion 108 to achieve the desired height compatible with the rear bed area of the particular vehicle in question. It is recognized that still other adjustment means may be utilized in order to accomplish the height adjustability of the platform member 60 relative to the base member 14.

Figure 9:
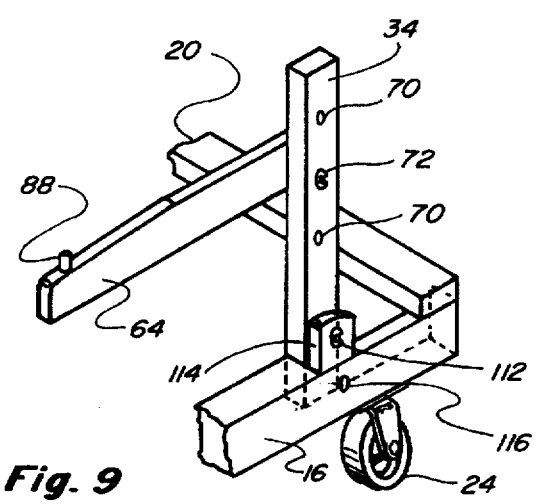
FIG. 9 is a partial perspective view of a pivotal connection between the upright support structure and the base member.

FIG. 9 illustrates an alternative connection arrangement wherein the upright support structure 32 may be rotatably attached to the base member 14. In this particular embodiment, the upright support members 34 and 36 rotate about a pivot pin 112 which passes through a pivot support member 114 and into at least a portion of the upright support members 34 and 36. The pivot support member 114 is attached to the base side wall members 16 and 18 as illustrated in FIG. 9. In this particular arrangement, the respective grooves 44 and 46 dimensioned to receive the upright extension portions 40 and 42 as best illustrated in FIG. 2 must be enlarged so as to allow the respective extension portions 40 and 42 to rotate therewithin without interference from the base side wall members 16 and 18. This pivot arrangement includes a locking pin 116 located below the pivot pin 112 as illustrated in FIG. 9 which functions to hold the upright support members 34 and 36 in place when the support structure 32 is positioned and located in its upright functional position. The locking pin 116 is designed to pass through both the respective base side wall member and the upright extension portion. This means that the upright support structure 32 can rotate about the individual pivot pins 112 from its operative vertical position to its horizontal storage position without having to disconnect the support structure 32 from the base member 14. It is recognized and anticipated that this pivot arrangement may take on a wide variety of other shapes and constructions so long as such arrangement allows for the rotation of the support structure 32 in at least a 90° plane between its upright operative position and its horizontal storage position as previously explained.

Figure 10:
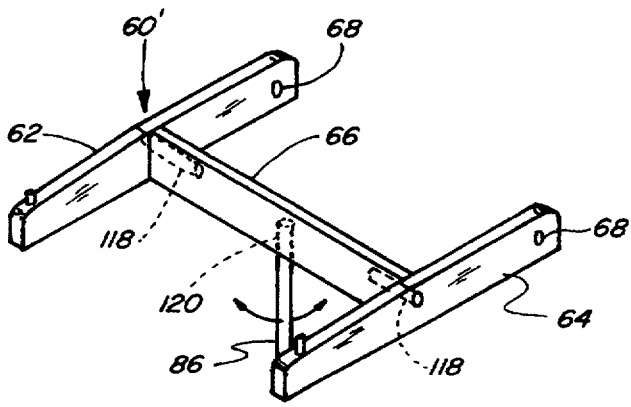
FIG. 10 is a perspective view of another embodiment of the platform member associated with the present cart device.

FIG. 10 discloses another embodiment of the present platform member 60' wherein the cross support member 66 is pivotally or rotatably mounted at each opposite end thereof to the platform support members 62 and 64. This pivotal attachment may be accomplished through the use of dowel pins 118 or other suitable pivot means. This pivotability of the cross support member 66 further facilitates positioning and alignment of the jack receiving means 86 with the jack means 76 for engagement therewith so as to quickly and easily move the platform member 60' into its proper elevated position for receiving a particular vehicle seat. In this regard, since the cross support member 66 is easily rotatable about pin members 118, such arrangement further obviates the need for pivotally mounting the jack receiving means 86 to the member 66 since such pivotability can now be accomplished by simply rotating the member 66. As such, the jack receiving bar means 86 can be fixedly secured to the cross member 66 by any suitable means such as by using a non-rotatable dowel arrangement 120 illustrated in FIG. 10. It is recognized and anticipated that other suitable means for both pivotally attaching the platform cross member 66 to the platform support members 62 and 64 and for fixedly attaching the jack receiving means 86 to the member 66 may likewise be utilized without departing from the spirit and scope of the present invention.

Although it is recognized that various acceptable materials of construction are available and could equally be employed to construct the various components of the present cart device 10, it is preferred that such components be constructed from metal, wood or other durable materials which are capable of supporting the weight of a typical vehicle seat positioned upon the platform member 60 as well as being able to withstand moderate impact and normal handling without breakage. It is also recognized that the various components of the present cart device 10 may be dimensioned and construction in a wide variety of different shapes and configurations without departing from the spirit and scope of the present invention.

Thus, there has been shown and described several embodiments of a novel vehicle seat transporter cart device which fulfills all of the objects and advantages sought therefor. Many changes, modifications, variations, and other uses and applications of the present constructions will, however, become apparent to those skilled in the art after considering this specification and the accompanying drawings. All such changes, modifications, variations, and other uses and applications which do not depart from the spirit and scope of the present invention are deemed to be covered by the invention which is limited only by the claims which follow.

What is claimed is:

1. A vehicle seat transporter cart device for receiving and transporting a vehicle seat from one location to another, said cart device comprising a base member having a plurality of wheel members associated therewith, a support structure including a pair of upright support members each having opposed end portions, one end portion of each of said pair of upright support members having an extension portion shaped and dimensioned to be received within and cooperatively engage with a corresponding cut-out portion located in said base member when said upright support members are located in a substantially vertical position relative to said base member, each said extension portion integrally mating with said corresponding cut-out portion to form a substantially flush connected therebetween, a portion of each of said upright support members resting upon a portion of said base member when said extension portions are engaged with said cut-out portions, a fastener member for removably attaching and detaching each of said extension portions to said corresponding cut-out portions, a platform member shaped and dimensioned for receiving and holding a vehicle seat when positioned thereon, said platform member including a pair of opposed side support members, means for removably and pivotally attaching said pair of opposed side platform support members to said pair of upright members at any one of a plurality of different locations along the length of said pair of upright support members so as to adjustably vary the height of said platform member relative to said base member, said platform member being pivotally attachable to said support structure so as to be angularly rotatable about any one of said plurality of different locations associated with said pair of upright support members between a first position which is substantially horizontal and parallel to said base member and a second position which is angularly related thereto, and means for supporting said platform member above said base member in a substantially parallel position relative thereto, said one end portion of each of said upright support members being selectively removably attachable to and detachable from said base member such that when said cart device is not in use said upright support members can be selectively detached from said base member and positioned in a substantially horizontal position on top of said base member for storage therewith.

2. The vehicle seat transporter cart device defined in claim 1 wherein said means for supporting said platform member above said base member in a substantially parallel position relative thereto includes jack means positionable on said base member.

3. The vehicle seat transporter cart device defined in claim 1 including a plurality of independent carrier assemblies, each carrier assembly having means associated therewith for engaging at least a portion of the understructure associated with a vehicle seat, each of said plurality of carrier assemblies further including wheel means for transporting a vehicle seat from one location to another when said plurality of carrier members are properly oriented and engaged with the understructure of the vehicle seat.

4. The vehicle seat transporter cart device defined in claim 3 wherein said base member includes a storage compartment for holding said carrier assemblies.

5. The vehicle seat transporter cart device defined in claim 1 wherein said platform member includes stop means for preventing a vehicle seat from sliding forward off of said platform member when the vehicle seat is positioned thereon.

6. A vehicle seat transporter cart device for receiving and transporting a vehicle seat from one location to another, said cart device comprising a base member having a plurality of wheel means associated therewith, an upright support structure including a pair of upright support members having means associated therewith for pivotally attaching one end portion of each of said pair of upright supports members to said base member, a platform member configured for receiving and holding a vehicle seat when positioned thereon, said platform member including a pair of opposed pin members, each of said upright support members including a slot formed therein dimensioned to receive one of said pin members, each of said slots including a plurality of offset portions, each of said slot offset portions being dimensioned to receive and hold one of said pin members when positioned therewithin such that when said pin members are engaged with a pair of slot offset portions aid platform member is held in a substantially horizontal position, said platform pin members being slidably movable within said slots so as to engage any one of said slot offset portions positioned along the length of said pair of upright support members thereby enabling the height of said platform member to be adjusted vertically relative to said base member without detaching said platform member from said support structure, and means positionable on said base member and engageable with said platform member for supporting said platform member in a substantially parallel position above said base member.

7. A cart device for receiving and transporting a vehicle seat from one location to another, said cart device comprising a base member having opposed front and rear support members, opposed side support members, and wheel means affixed thereto, an upright support structure including a pair of upright support members having means associated respectively therewith for removably attaching one end portion of each of said pair of upright support members to the respective side support members of said base member, a platform member dimensioned for receiving and holding a vehicle seat when positioned thereon, said platform member including a pair of opposed side support members and at least one transverse support member extending therebetween, means for adjustably removably attaching said pair of opposed side platform support members to said pair of upright support members so as to vary the height of said platform member relative to said base member, means for supporting said platform member above said base member in a position sufficient to hold a vehicle seat when positioned thereon, and a plurality of carrier assemblies, each carrier assembly having means associated therewith for engaging at least a portion of the understructure associated with a vehicle seat, said carrier assembly engaging means including an elongated slot, each of said plurality of carrier assemblies further including wheel means for transporting the vehicle seat from one location to another when said plurality of carrier members are properly oriented and engaged with the understructure of the vehicle seat.

8. The cart device defined in claim 7 wherein said means for adjustably removably attaching said pair of opposed side platform support members to said pair of upright support members includes a plurality of spaced openings associated with each of said pair of upright support members, each plurality of openings associated with one of said upright support members being arranged in opposed relationship to each plurality of openings associated with the other of said upright support members, an opening extending through each of said opposed side platform support members, said side platform support member openings being positionable in alignment with one opposed pair of openings associated with said pair of upright support members, and fastening means insertable through the aligned openings of said opposed side platform support members and said pair of upright support members.

9. The cart device defined in claim 8 wherein said platform member is pivotable about said fastening means insertable through the aligned openings of said opposed side platform support members and said pair of upright support members.

10. The cart device defined in claim 7 wherein each of said opposed side platform support members includes stop means for preventing a vehicle seat from sliding forward off of said platform member when the vehicle seat is positioned on said opposed side platform support members.

11. The cart device defined in claim 7 wherein said means for supporting the platform member above said base member in a position sufficient to hold a vehicle seat positioned thereon includes jack means positionable on said base member, said jack means being engageable with means associated with said platform member for supporting said platform member above said base member.

12. The cart device defined in claim 11 wherein said means associated with said platform member engageable with said jack means includes an elongated member attachable to said platform member.

13. The cart device defined in claim 11 including jack holding means located on said base member, said jack holding means being dimensioned so as to hold and prevent sideward movement of said jack means when engaged therewith.

14. The cart device defined in claim 7 wherein said base member includes a storage compartment for receiving and holding at least some of said carrier assemblies.

15. The cart device defined in claim 7 wherein said at least one transverse platform support member is rotatable relative to said pair of opposed side support members.

* * * * *

UNITED STATES PATENT AND TRADEMARK OFFICE
CERTIFICATE OF CORRECTION

PATENT NO.: 5,678,973

DATED: October 21, 1997

INVENTOR(S): Raymond G. Cox

It is certified that errors appear in the above-identified patent and that said Letters Patent is hereby corrected as shown below:

Col. 1, line 52, "being" should be --further--.

Col. 2, line 6, "comers" should be --corners--.

Col. 4, line 56, "comers" should be --corners--.

Col. 8, line 16, "comers" should be --corners--.

Col. 8, line 24, "comers" should be --corners--.

Col. 11, line 39, after "upright", insert --support--.

Col. 12, line 1, "blys" should be --blies--.

Col. 12, line 18, "supports" should be --support--.

Col. 12, line 28, "aid" should be --said--.

Signed and Sealed this

Thirteenth Day of January, 1998

Attest:

BRUCE LEHMAN

*Attesting Officer*   *Commissioner of Patents and Trademarks*